INVENTOR.
JAKOB ZAWELS
ERIK D. RENAUD
By Young & Thompson
ATTYS.

United States Patent Office 3,606,688
Patented Sept. 21, 1971

3,606,688
METHOD AND APPARATUS FOR TEACHING A MULTIPLICITY OF STUDENTS
Jakob Zawels and Eric D. Renaud, Pretoria, Republic of South Africa, assignors to Associated Research Laboratories (Proprietary) Limited, Pretoria, Republic of South Africa
Filed July 11, 1969, Ser. No. 840,918
Claims priority, application Republic of South Africa, July 19, 1968, 68/4,656
Int. Cl. G09b 7/02
U.S. Cl. 35—9R
15 Claims

ABSTRACT OF THE DISCLOSURE

A method and apparatus for simultaneously teaching in real-time from a teaching centre a multiplicity of students located remotely from the centre. A typical teaching centre is a television studio suitably modified. There can be virtually an unlimited number of students scattered over a virtually unlimited area, the limitation being the quality of reception at a student locality. Each student is able to respond to questions which appear to him on his output means, e.g. a television screen and each obtains a personal immediate indication as to whether he is right or wrong and in some instances, the probable flaw in his reasoning if he is wrong. Typically, this is made possible by transmitting together with questions (or requests) from the teaching centre, potential responses including the correct answers to the questions, and, in some instances, several likely wrong answers to the questions, together with remarks relevant to each wrong answer. At each student locality the questions (or requests) are put to the students on their output means. The correct answers are, however, hidden from the students and are used for comparing with each student's response. The result of the comparison is used to give the appropriate information to the student.

---

This invention relates to a method and apparatus for teaching a multiplicity of students.

There are two basic methods and apparatuses for teaching a multiplicity of students especially those who are remote from a teacher or teaching centre.

In a typical system of a first kind, a student could communicate with a remotely situated computer by means of a teleprinter. What in fact happens is that the student inserts on his teleprinter the lesson that he wishes to receive and then by telex line this information is communicated to the computer into which a teacher has previously stored a lesson. The computer is programmed so as to transmit the lesson to the student so that it is received on the student's teleprinter. The content of the lesson is such that at some point a question is asked of the student by it appearing on the student's teleprinter. The student then responds to the question of the teleprinter and his response is transmitted back to the computer where is response is compared with the answer to the question previously stored in the computer as part of the lesson. The computer will then send back a message to the student to indicate to the student on his teleprinter whether he is right or wrong.

It is clear that this method of teaching will be expensive in the case of many students scattered in remote places, because a separate telex line must be hired for the duration of the lesson for each student. Even if the multiplicity of students were situated in one locality which is remote from the teaching centre and carrier wave transmission over a multi-channel common coaxial cable were employed, the information carrying capacity of the cable would have to be very large in order to cater for a large volume of information flow in both directions viz. educational material, questions based on this information and the indication to each individual student as to whether he is right or wrong in one direction, and the individual responses of each student in the opposite direction. In fact, because of these requirements, this method of teaching is often impracticable. Furthermore, this method requires a computer at the teaching centre which is unpredictably large since it has to cater for a varying number of students depending on the lesson. Indeed it is clear that a system of this type is essentially limited by the conditions within the teaching centre and the number and/or capacity of communication channels available for two-way communication.

A typical system of a second kind makes use of television commonly called educational television (ETV). In a TV system, the teaching centre is a studio from which lesson material is electro-magnetically transmitted to any student who has a television receiving set available to him. The electromagnetic transmission may be with or without conductors. It includes broadcasting through free space (e.g. broadcast TV) and transmission via a coaxial cable (e.g. wired TV) from which tappings are made for each receiving set. In this system there are virtually no limitations at the studio end of the transmission (or by the number of communication channels) on the number of students who can be taught, and real-time information flow is in one direction only. In operation of the system a teacher presents a lesson, either live or via a video tape recorder from the studio, and this is transmitted to schools all over the country. The great disadvantage of this system, however, is that the student tends to be placed in a substantially passive role. It is generally accepted that a student who is placed in a passive role can concentrate on a TV lesson only for a very short time, before his mind starts to wander. Furthermore, even if the teacher on the television screen were to ask each student to respond to questions by writing responses on paper and sending these responses to him for grading and return, or for student self-evaluation, the system lacks an objective, automatic and exact means of testing whether or not the response of the pupil in fact corresponds to the response that the teacher appearing on the screen sought to elicit.

Finally, there is an absence of certain essential accepted psychological requirements for the learning process including the absence of an immediate individual "reward" or reinforcement for each student when he responds to a question correctly.

An extension of the use of television for teaching purposes has been proposed for use by a developed country to help an underdeveloped country, by means of a space satellite which would for example transmit an educational programme from New York to countless students in an underdeveloped country. The proposers of this idea have, however, themselves expressed a fundamental weakness of the idea as it stands in that the pupils in the underdeveloped country lack a feeling of personal involvement in the lesson. To overcome this limitation the proposers suggest that a mobile transmitting station visit a particular school during a programme and transmit back contemporaneous remarks by a few students. This is however, not of much help, since in the case of say half-a-million students, the rest of the students who passively watch their TV screens, are hardly likely to be influenced by the remarks of a particular student—indeed it could even lead to the opposite of the desired result.

An object of the present invention is to minimize the disadvantages in known methods and apparatuses for teaching large numbers of students.

A further object of the present invention is to provide a new and improved method and apparatus for teaching a multiplicity of students who are at points remote from the location of the centre from which the lesson is being transmitted.

A further object of the invention is to provide in a particular embodiment a method and apparatus for converting existing educational television systems, including those broadcasting through free space, into system in which an unlimited number of students-at-large within range of reasonable reception may each respond to questions including requests put to them on their television screens and each receive a consequence signal depending on the individual student's response.

A further object of the present invention is to provide a method and apparatus which is capable in a particular embodiment of accepting constructed answers or responses from a student and providing him if required with immediate character by character reinforcement and, on a specific request of a particular student, providing him with the correct answer to a question and, at the end of lesson, the number of correct and wrong responses.

According to the invention a method of simultaneously teaching in real-time from a central locality information to a multiplicity of students located remotely from the central locality, includes the steps of electromagnetically transmitting, from the central locality to the locality of each student, information in a predetermined format including a question accompanied by at least one preconceived potential response to the question, the potential response comprising a chain of characters and being transmitted sequentially in association with particular consequence signal information, presenting the transmitted question to the student but hiding the association between a potential response and a particular consequence signal from the student, automatically comparing for equality sequentially within a student's locality a student's multicharacter response with each pertinent potential response and transmitting to the student consequence signals depending on the result of the comparison.

A "question" is meant to include a request since any question can be rephrased as a request for information.

A potential response includes one of several correct or wrong responses to a question.

A consequence signal to a student includes an indication (i.e. a perceptible signal) to the student as to whether he is right or wrong, as well as the giving of other information to him.

By "hiding" is meant "keeping from being known or understood." As an example, in a multiple choice question the correct answer, although being given to the student together with wrong answers, is kept from being known by the students, and hence is "hidden."

Further according to the invention the question and the potential response, information is transmitted via substantially the identical electromagnetic transmitting path.

Still further according to the invention the automatic comparing and the signalling within a student's locality includes the steps of comparing at the time of selection each character selected by the student during a response with homologous character of each pertinent multicharacter potential response, transmitting to the student a first signal immediately the result of a comparison on a student character selection is equality and a differing second signal immediately a complete order of correct student characters selected is identical to the complete order of characters of a potential response.

Apparatus according to the invention for simultaneously teaching in real-time from a teaching studio a multiplicity of students each at a locality remote from the studio, including a question and potential response input means and a transmitter at a teaching station; input, output and logic means including comparator logic means and a receiver at the student locality; an electromagnetic energy transmitting medium between the transmitter at the teaching station and the receiver at a student locality; the transmitter being adapted to receive information, including a question accompanied by at least one preconceived potential response, from the question and potential response input means respectively at the teaching station in a predetermined format and to transmit the information electromagnetically to the receiver at a student locality via the electromagnetic energy transmitting medium; the receiver being adapted to send the question to the local output means and each pertinent potential response to the local comparator logic means; the logic means being adapted to receive each pertinent potential response from the receiver and the response from a local input means, and to signal the result of the comparison via the local output means.

In the meaning of "electromagnetic energy transmitting medium" is included free space, twin conductors in particular a coaxial cable, a single waveguide or a pipe.

The "receiver" in a student locality is the apparatus for translating the signals received into audio and/or video and electrical, etc. signals. Noise suppression and storage elements for averaging signals received or for other reassons are to be included. In particular, if desired, a store for storing the potential responses to a question, in order to avoid any possible disturbance to the student caused by a continual retransmission of the coded potential responses for the period of a student's responses, may be included in the receiver as it does not effect the essential elements of the invention, including the real-time aspect. Indeed, the store could even be large enough to contain the responses to more than one question provided these responses are suitably labelled or tagged by, say, a number, and this number (instead of the actual potential responses) is transmitted together with the relevant question. This tag may be regarded as an encoded portential response and this method is another way of "hiding" the answer from the student while preserving the real-time aspect.

Further according to the invention, the apparatus includes at least one potential response comprising a predetermined chain of characters, the transmitter at the teaching station being further adapted to transmit the multicharacter potential response to the receiver at the student locality, together with format information; the apparatus at each student locality includes additionally, decision information storage means and potential response character selection means adapted to select a character from the multicharacter potential response received by the receiver for transmission to the logic means, the selection depending on information including that in the decision storage means; the student input means being further adapted to transmit to the logic means a chain of student character selections one by one, at the time of selection of each character in association with the transmission to the logic means of character selection confirmation information; the student output means being adapted to receive decision signals from the logic means; the comparator logic means being adapted to compare a character selection transmitted from a student input means with a character obtained via the potential response character selection means from the multi-character potential response received by the receiver from the teaching station and to generate a result for each comparison; the logic means being further adapted to receive information from the decision information storage means and format information from the receiver at the student locality and to generate and transmit, at the time of selection of each character on the student input means, decisions based on the format information, on the character selection confirmation information, on information from the decision information storage means, and on the result of each comparison, the decisions including a decision for storage in the decision information storage means determining the selection by the potential response character selection means of the next character (if any) of the potential response received by the receiver from the teaching station and a first decision signal to the student output means immediately a student character selection differs from the homologous character of every relevant potential response and a differing second decision signal to the student output means immediately a complete order of correct student character selections from the student input means is identical to the complete order of characters of a pertinent potential response.

The "potential response character selection means" above are the means whereby a particular character of the potential response received by the receiver from the teaching station is selected for comparison with the appropriate character of the student's response, the selection is based on previous decisions in the decision information storage means.

"Logic means" includes specific character recognition means and the decision forming means, one or more decisions being generated and transmitted based on one or more input conditions.

The "decision information storage means" store at least one decision from the logic means, the decision determining the character of the answer received by the receiver from the teaching station which should next be selected by the character selection means and transmitted to the comparator logic means for comparison with a character of the student's response.

The "character selection confirmation information" is additional information generated by a student input means to confirm to the rest of the apparatus in a student's locality that a character has in fact been selected on the student input means and enables the logical process to proceed. It may be generated on a separate line or it can be included on the same lines with the encoded signals from the student's input means in the form of, say, a character "end" pulse. It also enables to demarcate successive character inputs from each other.

The "format information" referred to includes that information which must be transmitted with a multicharacter answer from the teaching station to every receiver at a student locality to specify the end of the multicharacter potential response (called end-of-response format symbol) in order to make it possible for example to give to the student a signal different from any other signals (called end-of-correct-response signal) immediately a student's response equals the answer received by the receiver from the teaching station.

By immediately is meant a time preferably not exceeding the order of magnitude of 0.1 second which is the reaction time of a human being, and preferably less than 0.1 second.

To illustrate the invention an embodiment thereof is described below with reference to the accompanying drawings in which.

Figure 1:
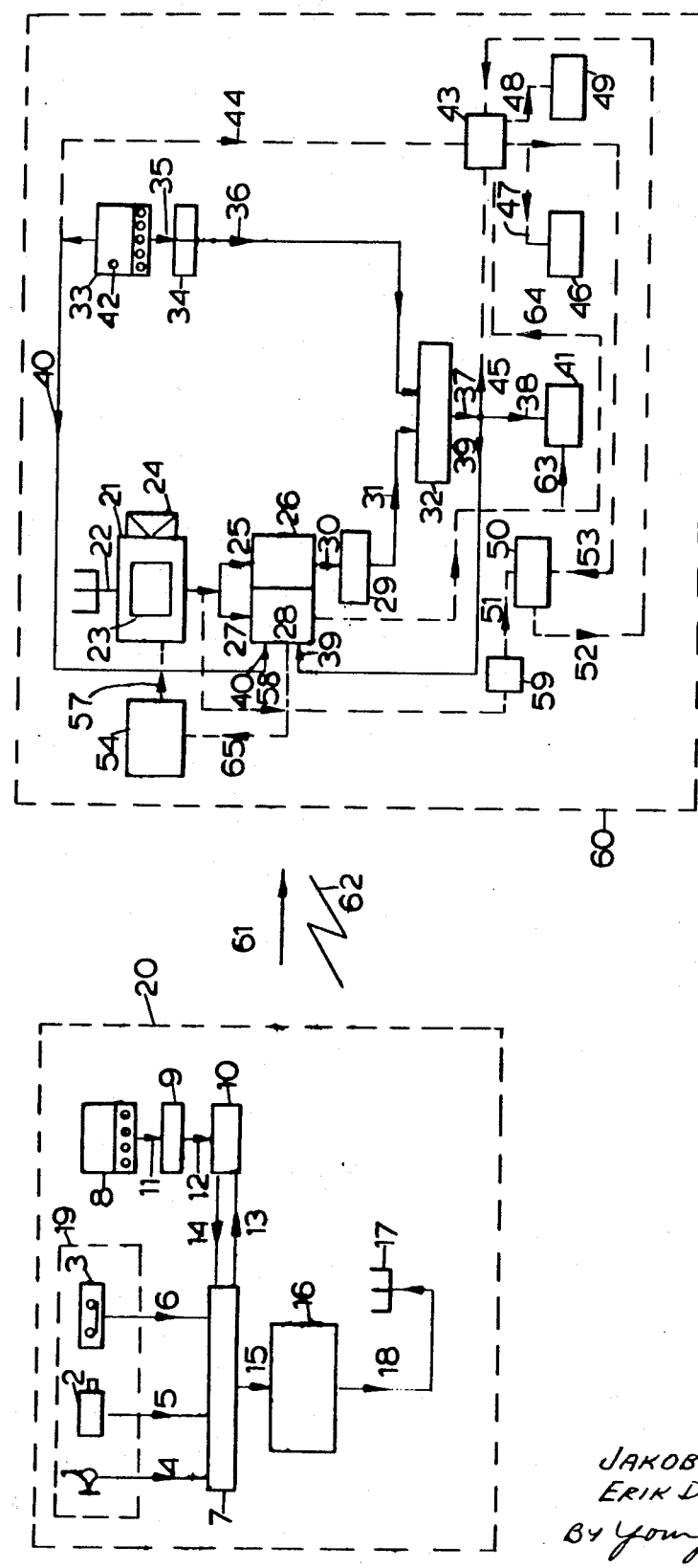
FIG. 1 is a schematic block diagram of the equipment associated with a teaching station and the equipment associated with a student at his locality.

In FIG. 1, block 19 illustrates the equipment normally associated with a teaching studio while block 20, henceforth to be referred to as the teaching station, includes also the additional equipment required according to the invention, as well as the electronic transmitting unit 16 and the transmitter antenna 17.

Block 60 includes the equipment required at a student's locality while 61 represents the electromagnetic energy transmitting medium through which the electromagnetic energy 62 travels from the teaching station 20 to the student's locality 60. In this embodiment the medium is assumed to be free space, although in other embodiments it may for example be a coaxial cable or it may contain several relay stations, some of which may be linked by coaxial cable.

Within the teaching studio 19, which in this embodiment is a television studio, is a microphone 1 and a camera 2 for live broadcasts and a video-tape recorder 3 for playback of pre-recorded information. The microphone 1, the camera 2 and the video-tape recorder 3 are connected via lines 4, 5 and 6 to a unit 7, where the various signals are processed by, for example, modulating subcarriers, i.e. they are separably combined for eventual broadcast on one carrier, although in other embodiments several carriers at different frequencies may be used provided that the transmitter and the receivers are suitably adapted.

In the event of a live broadcast, a teleprinter 8 is used as an input means for potential responses which here are assumed to be the answers to questions which are posed by the teacher.

The teleprinter 8 output information to an encoder 9 via line 11 from which it proceeds via line 12 to a store 10 where the answer to the question is stored in a magnetic core-store. The unit 7, at appropriate instances in time calls via line 13 for each character in turn stored in store 10 and obtains the character on line 14, so that the answer information contained in store 10 together with the information emanating from the microphone 1, the camera 2 or the video-tape recorder 3 are sent in proper format via line 15 to the electronic transmitting unit 16, where after further processing onto a suitable electromagnetic carrier, it is sent via line 18 to the transmitter antenna 17 from where it is broadcast to the students at large.

In this embodiment of the invention the answer information contained in store 10 is repeatedly read out via line 14 so that each character of the answer, in sequence appears on a different video line of the signal. Thus in a television system working on 625 horizontal lines the first 25 lines (of the first field in the case of conventional interlaced scanning) are set aside for an answer which can be up to 25 characters long. Thus on each video line in say a six-level code, an alpha-numeric character or other symbol is encoded. For example, if one video line is traced in about 50 microseconds then the line can be considered to be divided into six equal portions of 9 microseconds each and the brightness signal is switched fully on or off in each portion in accordance with the six-level code. If now the 25 lines at the top of a TV screen are distracting or may be interpreted by a student, his receiver is adjusted to prevent these 25 lines from appearing on the screen.

In the student locality 60 various blocks are shown, the most important of which are linked by solid lines.

A suitably modified television receiver 21 having antenna 22 has a screen 23 and a speaker 24.

The answer information on the first 25 lines of the video signal as well as a synchronizing signal are obtained via lines 25 and 27 from the television receiver 21 and sent as outlined below to a sequential character selector comprising blocks 26 and 28.

The sequential character selector consists of gate 26 and gate control unit 28 which causes the gate 26 to open and close for the period of one line scan to allow one character of the answer to pass through the gate 26. In this manner each character may be passed through the gate in turn to the serial-to-parallel convertor 29, via line 30, which in turn sends it out via line 31 to comparator 32.

The actual character which is passed through gate 26 is dictated by the incoming lines on gate control unit 28. In particular, with every equality result signal received on line 39, the gate control unit 28 may step and allow the character on the next line of the first 25 lines of the video signal to be sent out on line 30.

Student input means 33 contains alpha-numeric characters and symbols available for student selection, plus a special symbol 42 (an asterisk) which is used to reset the equipment via a line 40 after every response, but in principle is not essential if only one attempt per question is allowed, as the equipment could be reset by an end-ofresponse-period symbol received on line 27. The selection of a character on the student's input means 33, causes the character to be transmitted to encoder 34 via line 35, where it is converted to a six level bit-parallel output, identical in code to that on line 31, to be transmitted further via line 36, to the comparator 32. The comparator compares the two characters received via lines 31 and 36 and transmits the result of the comparison on line 37, and thence on lines 39 and 45.

The result of the comparison of comparator 32 is used to indicate to the student on a lamp 41, which is part of his output means, whether the character that he has selected on his input means 33 equals the character received on line 31 which would imply that that character forming part of his response is correct as follows. If in fact he is correct, a pulse is sent on line 39 to the sequential character selector, blocks 28 and 26, to cause a pulse on line 63 resulting in the lamp 41 lighting up, and to cause the next character of the answer to be available for comparison with the next character of the student's response.

The concept of a sequential character selector, blocks 26 and 28 is here intended to simplify the description but in principle contains three elements. The first is potential response character selection means which enables one character at a time to be selected out of the potential response received, the selection being based on a previous decision in a decision information storage means and on the current decision. The second is the decision information storage means which stores the decision (from logic means) determining the next character that must be selected and transmitted to the comparator for comparison with the student character selection. The third is the logic means (including special character recognition means) for making decisions, one of which is stored in the decision information storage means for the purpose stated above.

As a first sophistication of the system the logic means inherent within blocks 26 and 28 on receiving the necessary input on line 27 corresponding to the end-of-response format symbol already defined also makes a decision to send a special distinctive signal to lamp 41 via line 63 (the end-of-correct-response signal) to reward the student for a response correctly completed. To summarize, in general the logic means generates the stated decisions transmitted via lines 30 and 63 based on format information on line 27, received with each potential response; a character selection confirmation information (already defined on line 40, and/or the result of the comparison by comparator 32, on line 39.

The actual logic expressions involved in the logic means follow.

Let
L=a signal transmitted to lamp 41
W=pulse causing decision information to be written in the decision information storage means
Wc=pulse derived from differentiating negative going portion of W
Er=the signal for erasing W
Erc=pulse derived from differentiating negative going portion of Er
E=the equality signal from comparator 32 on line 39
K=character selection confirmation signal
Kc=the pulse derived from differentiating K
$=end-of-response-period signal (sent once in between every question asked from transmitting station)
&=signal corresponding to end-of-response format symbol
X=low frequency signal (about 4 pulses per second) from flicker signal generator
*=pulse resulting from selection by a student of reset symbol;

The set and reset conditions for four flip-flops follow:

Continuous light signal to student
  $Cf$ Set: $.E.K.\&$
    Reset: $\$+\bar{E}.Kc$ Flicker light signal to student
  $Ff$ Set: $.E.K.\&$
    Reset: $\$+\bar{E}.Kc$
Write in store
  $Wf$ Set: $E.K$
    Reset: $\overline{Wc}$
Erase in store
  $Erf$ Set: $\bar{E}.K$
    Reset: $\overline{Erc}$ The logical equations follow:

$L = Cf + Ff.X$
$W = Wf.A$
$Er = Erf.A$ where A represents a decision information storage means register in the form of a ring counter with the following conditions:

increment: $E.K$
  reset: $\$+*$

The interpretation of these equations are known to those skilled in the art, plus (+) being an "or" condition and a multiplication (.) representing an "and" condition.

From the logical expressions, the logic diagram is easily constructed by those skilled in the art of computer logic design while from the logic diagram the actual gates and interconnections are immediately apparent.

Figure 2:
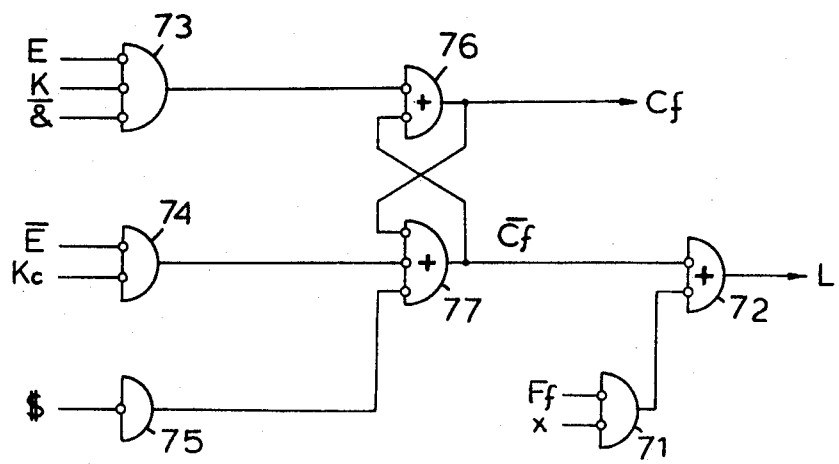
FIG. 2 illustrates a portion of the logic diagram applicable to the logic means.

To illustrate the manner in which this is accomplished FIG. 2 shows the logical diagram applicable to the function L as well as to the continuous light flip-flop $Cf$. In FIG. 2 the gates marked with a + sign are used as "nor" gates while the remainder are used as "nand" gates. Referring particularly to the logic expression L it is represented by two gates 71 and 72, 71 being the "nand" gate and 72 being the "nor" gate. The inputs of gate 71 are flip-flop $Ff$ and low frequency signal X. The output of gates 71 together with the "not" condition of the flip-flop $Cf$ are "norred" in gate 72 to produce the final output L. The rest of the gates 73 to 77 represent the flip-flop $Cf$ as well as the input conditions pertaining thereto. Gates 76 and 77 form the actual flip-flop.

The actual conditions to gates 73, 74 and 75 are marked on the diagram.

In operation the output $Cf$ will be a "1" if the input conditions E, K and & are met, and will be "0" (i.e. $\overline{Cf}$) if the conditions $\bar{E}$, $K_c$ and $ are met in the manner indicated.

As a second sophistication of the system, in order to obtain a performance score for the student on the whole lesson, which involves several questions and answers in succession, logic block 43 receives the result of the comparison of comparator 32, via line 45 (FIG. 1). If an end-of-correct-response signal on line 63 is also sent via line 64 to logic block 43, then the student's "right" counter 46 has its total increased by one, through a pulse on line 47. If at any time the student selects a character or symbol on his input means 33 (to cause a character selection confirmation signal on line 44, as the case was in line 40) and the comparator 32 indicates inequality, then the "wrong" counter 49 has its total increased by one through a pulse on line 48.

To prevent the student from being scored, on counters 46 or 49, more than once in relation to the same question, the logic unit 43 is inhibited after it has operated once during an answer period by flip-flop 50, via line 52. The teaching studio 19 only sends out the answer to a question for a limited period and in between it sends out the identifiable signal, e.g. a $, which is picked up on line 58 and, if identified by block 59, causes flip-flop 50 to be "set" by line 51. As soon as logic block 43 has caused one of the counters 46 or 49 to operate, it sends a signal on line 53, which "resets" flip-flop 50 which in turn via line 52 inhibits the logic block 43 from allowing counters 46 and 49 to operate.

A further sophistication can be added to the equipment by the use of blanking generator 54 as follows. Suppose that in addition to the question and the hidden answer being sent from the teaching studio 19, a fully spelled out answer is also sent from the teaching studio 19, for potential intelligible appearance on the TV receiver screen 23 in an area covered by a second group of 25 lines of the 625 screen display.

Each character of the answer received will not appear equally spaced from left to right in this area providing blanking generator 54 does not inhibit this through signals it generates and sends out via line 57, to the TV receiver 21, by modulating the brightness of the beam in this area. The blanking generator 54 by virtue of the logic means inherent in unit 28 sends pulses on line 65, capable of blanking out any number of characters of the answer from right to left. Thus when the student selects the asterisk 42 on his input means to reset his equipment via line 40 before he responds, all the characters of the answer received will be blanked out, by means of a pulse on line 65, which is generated by unit 28 simultaneously with the signal it generates to cause the gate 26 to allow the first character of the answer received to pass through on line 30. When unit 28 receives the equality signal on line 39 to cause the second character to pass through on line 30, a simultaneous signal on line 65 causes the first character of the answer received to be unblanked and so on, until the whole answer received is exposed.

In operation, during a live broadcast a teacher will talk to his students-at-large via the microphone 1 while the camera 2 is trained on him. At one point during his lesson he will ask a question such as: Could you tell me the name of the most famous French general who lived around the year 1800? Simultaneously with his asking this question or immediately prior to it, the word NAPOLEON& (the & serves as an end-of-response format symbol) is inserted via the input means 8. The unit 7 now transmits to the electronic transmitter unit 16, for eventual transmission via the TV antenna 17, appropriately processed audio, video and synchronizing signals such that on a television receiver tuned to the correct frequency, the answer received appears in encoded form on the first 25 lines of the TV screen display.

The student on hearing the question put to him by the teacher via the speaker 24, and while watching the teacher on the screen 23, responds by using his input means 33. Let us assume that the first 25 lines of the display on the screen 23 are masked or in fact are absent through adjustment of the vertical gain of the TV receiver 21 or if visible to the student is unintelligible to him. The student responds by first selecting the asterisk symbol 42 which resets his equipment and causes the letter N (the first letter of his intended response) to be conveyed on line 30 and thence on line 31. Immediately after selecting the letter N, the comparator 32 having received the letters N on line 36 from the student and on line 31 from gate 26, indicates to the student on his lamp 41 that he is correct, by the lamp lighting up. The comparator now causes the gate control unit 28 to operate such that the gate 26 allows the letter A to be conveyed on line 31 in a suitable coded form, and if the student now selects A on his input means 33 then again the comparator 32 will indicate equality and the student's lamp 41 will again light up. In this way, character-by-character, the student inserts the answer and his lamp 41 lights up every time providing the student makes no mistakes. Finally, having just inserted the last letter of NAPOLEON on input means 33, the gate control unit 28 recognizes the & symbol on line 27 and causes the special end-of-correct-response signal to be given to the student via line 63 and lamp 41, by the lamp flickering. Now the logic unit 43 having also received the end-of-response signal on line 64 causes the "right" score counter 46 to add one as an eventual indication to the student of his total score.

Should the student at any time make a mistake while inserting his response on the input means 33, his lamp 41 will not light up. Having received an indication on line 44 that an answer was inserted, and on line 45 that there is no equality, the logic unit 43 will cause his "wrong" counter 49 to add one, as a record of the number of errors that he has made.

Next we illustrate the operation of blanking generator 54.

Immediately after the student inserts the asterisk symbol, the screen 23 is cleared. When he inserts the first N of NAPOLEON, the comparator 32, via unit 28 causes the blanking generator 54 (due to the signal received via line 65) to allow only the N of NAPOLEON to appear on the screen 23 in the space of the second 25 lines of the 625 line display. Next when the student inserts A the blanking generator allows the letter A to appear on the screen 23 and so on, so that the student gets the impression that he is writing the word NAPOLEON directly onto the screen. Of course when he makes a mistake, the mistaken character does not appear on the screen. Psychologically speaking this is a very good method of reinforcing the student's correct responses as on correct information appears on the screen.

If NAPOLEON were part of a multiple choice question of which it was, say, the third choice, the blanking generator 54 could be modified such that when the student inserts "3" the whole word NAPOLEON would appear at once on the screen provided that the transmitter 17 at the teaching station 20, transmits the digit "3" followed by the word NAPOLEON. What happens is that, at the student locality, the display of the word NAPOLEON on the screen 23 of the receiver 21 is blocked off by a gate which allows the word NAPOLEON to appear on the screen if the comparator 32 indicates equality between the student's response (on line 36) and the potential response (on line 31) which in this case is of course, the digit "3."

It now follows that a message, other than NAPOLEON, may follow the digit "3" such as "your choice is correct" or in the case of a wrong selection "we asked you for the name of the French general and not his opponent." These statements are termed "consequence information" or "consequence signals" and are the consequences to a student for his particular response. The correct answer of course may also be given to him at his specific request. In this example it is seen that the consequence information is transmitted together with the question and potential response, whereas in other embodiments it may be omitted. In the mode of operation described with reference to FIG. 1, the consequence is conditional on the & sign, in that, when the student has completed his response correctly, the & sign automatically causes a student's lamp to flicker, thereby informing the student that the "consequence" to him for his response is that he is correct.

Although in FIG. 1 the comparator 32 receives its input on lines 31 and 36 from the serial-to-parallel converter 29 and the encoder 34, respectively, in a six-bit-parallel code, in other embodiments the coding and the comparator may be quite different. In particular, a single character correct answer may for example, be encoded on a time division basis such that, for example, an "A" corresponds to a time interval of five micro-seconds, from a synchronizing pulse, "B" ten micro-seconds, a "C" fifteen micro-seconds, etc. The synchronizing pulse may be one of the synchronizing pulses used in a television receiver, e.g. a frame sync pulse, in which case the student's input means must be coupled such that the eventual signals emanating from its encoder are properly phased with that of the correct answer received by the receiver. Thus the sync pulse from the TV receiver becomes the reference time pulse. Using this principle the so-called "light-pen" combined with CRT type of terminal can be employed by a student.

Although in the above embodiment, the answer information is incorporated in the video signal, in other embodiments it can be incorporated in the audio signal or within the synchronizing signal intervals or within a combination of these or within a separate signal.

It should also be clear that by the duplication of some equipment, not necessarily including the TV receiver, several students can be handled at a student locality.

In the embodiments of the invention described, all information flows unidirectionally from the teaching studio to the various localities, permitting a virtually unlimited number of students to respond individually to questions and receive individual rewards and consequences. There is merit, however, in feeding some information from the student localities back to the teaching studio. As an example, consider that the teaching studio is in a city A where there are 10 schools located while in city B, many miles away, there are 20 schools, in city C another 20 and in city D, 40 schools. Suppose now that in a classroom in each school there is one television receiver coupled to the terminals of fifty students. In each classroom a totalizer which adds up the number of correct and wrong responses in the classroom is also provided. The totals are sent automatically via telex lines to a totalizing centre in the city in which the school finds itself, where the number of correct and incorrect responses of the whole city are added up. The totals are then sent via long-distance telex line to the teaching studio in city A, where the totals from the various cities are automatically added to give a final figure on how many students have responded correctly and incorrectly to a particular question. This information can be immediately automatically transmitted from the teaching studio to appear on the screens in the classrooms. Thus the teacher in the television teaching studio has feedback which enables him to modify his presentation in the light of the performance of the students. At the same time the local teacher has a nationwide norm against which to evaluate the performance of his own class, and which is useful to him for providing local remedial action. Such a system in conjunction with the encoding of the potential responses on the audio rather than the video signal of the TV transmission, is described in South African Provisional Patent application No. 68/4656.

It will be noted that the cost of transmitting the information from the students back to the studio is minimal, since each school has to bear the cost of a local telex message, the long distance call being a cost shared by all the schools in the area. Furthermore, the amount of information being transmitted is extremely small, since for all intents and purposes, a few digits are transmitted from a school only once per question. Since a typical programme lasts about one-half hour and there are about 20 questions per programme, the costs in a developed country are virtually negligible.

We claim:

1. A method of simultaneously teaching in real-time from a central locality information to a multiplicity of students located remotely from the central locality, including the steps of electromagnetically transmitting, from the central locality to the locality of each student, information in a predetermined format including a question accompanied by at least one preconceived potential response to the question, the potental response comprising a chain of characters and being transmitted sequentially in association with particular consequence signal information, presenting the transmitted question to the student but hiding the association between a potential response and a particular consequence signal from the student, automatically comparing for equality character sequentially within a student's locality a student's multicharacter response with each pertinent potential response and transmitting to the student consequence signals depending on the result of the comparison.

2. The method claimed in claim 1 in which the students are at different localities remote from the central locality.

3. The method in claim 1 in which all the information is transmitted via substantially the identical electromagnetic transmitting path.

4. The method claimed in claim 1 in which the automatic comparing and the signalling within a student's locality includes the steps of comparing, at the time of selection, each character selected by the student during a response with a homologous character of each pertinent multicharacter potential response, transmitting to the student a first signal immediately the result of a comparison on a student character selection is equality and a differing second signal immediately a complete order of correct student characters selected is identical to the complete order of characters of a potential response.

5. The method claimed in claim 4 in which every preconceived potential response is a correct answer to the question and is hidden from each student, the signal received by the student being the result of the comparison between the actual student response and the correct answers.

6. The method claimed in claim 1 in which the multicharacter potential response is transmitted from the central locality repeatedly during the answer period.

7. The method claimed in claim 1 in which the aggregate of results of comparisons of a multiplicity of students in a student locality is transmitted at the end-of-answer-period to the central locality.

8. The method claimed in claim 7 in which the aggregate of the results received at the central locality is transmitted at the end-of-answer-period to the student localities.

9. Educational television apparatus for simultaneously teaching in real-time from a teaching station a multiplicity of students each at a locality remote from the station, including a question and potential response and format information input means and a transmitter at the teaching station; student input and output means, potential response character selection means, decision information storage means, logic means including comparator logic means, and a receiver at the student locality; an electromagnetic energy transmitting medium between the transmitter at the teaching station and the receiver at the student locality; the transmitter being adapted to receive information, including a question accompanied by at least one preconceived potential response comprising a chain of characters, and format information from the question and potential response and format information input means respectively at the teaching station and to transmit the information electromagnetically to the receiver at the student locality via the electromagnetic energy transmitting medium; the receiver being adapted to receive the information from the transmitter and to output the question via the output means of the receiver and to transmit each potential response and format information to the logic means; the student input and output means being adapted to transmit to the logic means a chain of character selections one by one, at the time of selection of each character accompanied by character selection confirmation information, and to receive decision signals from the logic means and to emit perceptible signals accordingly; the comparator logic means being adapted to compare a character selection received from the student input means with a character selected by the potential response character selection means from the potential response received from the receiver and to generate a result for each comparison; the logic means being further adapted to receive relevant information from the decision information storage means and based on this information, on the result of the current comparison, on relevant format information and on the character selection confirmation information, to generate and transmit at the time of comparison decisions including a decision recorded in the decision information storage means, determining the selection for comparison, by the potential response character selection means, of the next character, if any, of the potential response, and decisions to the student output means, to emit perceptible signals accordingly.

10. The apparatus claimed in claim 9 in which the logic means is further adapted to generate and transmit, at the time of selection of each character on the student input means, a first decision signal to emit a perceptible signal via the student output means immediately following a student character selection for which the result of comparison is equality, and a differing second decision signal to emit a differing perceptible signal via the student output means immediately a complete order of student character selections from the student input means is identical to the complete order of characters of a pertinent potential response.

11. The apparatus claimed in claim 9 in which the teaching station includes a store of capacity sufficient to store the potential response and in which the transmitter is further adapted to receive the information from the store and transmit it repetitively in a predetermined format.

12. The apparatus claimed in claim 9 in which the transmitter at the teaching station is adapted to transmit consequence signals with the potential response signal received from the input means at the teaching station, to the receiver at the student locality; and in which the receiver is adapted to output the consequence signal via the local output means when the chain of characters selected on the student input means is identical to the chain of characters of the potential response.

13. The apparatus claimed in claim 9 in which the receiver at a student locality is common to a multiplicity of student input and output means at the same locality.

14. The apparatus claimed in claim 13 in which totalizers at a student locality are adapted to totalize the correct and the incorrect responses at a student locality and to transmit at the end-of-answer period the aggregates to the teaching station.

15. The apparatus claimed in claim 14 in which totalizers at the teaching station are adapted to totalize the aggregates received at the teaching station and to transmit at the end-of-response-period the resulting aggregates to the receivers at the student localities.

References Cited
UNITED STATES PATENTS

| | | | |
|---|---|---|---|
| 3,052,041 | 9/1962 | Luxton et al. | 35—9 |
| 3,095,653 | 7/1963 | Corrigan | 35—9 |
| 3,245,157 | 4/1966 | Laviana | 35—9 |

WILLIAM H. CRIEB, Primary Examiner

U.S. Cl. X.R.

178—5.8R; 325—31